(12) United States Patent
Nast

(10) Patent No.: US 7,458,323 B2
(45) Date of Patent: Dec. 2, 2008

(54) VEHICLE ADAPTED TO MOVE ALONG A RAIL

(75) Inventor: Jean-Daniel Nast, Le Creusot (FR)

(73) Assignee: Alstom Transport, SA, Levallois-Perret (FR)

( * ) Notice: Subject to any disclaimer, the term of this patent is extended or adjusted under 35 U.S.C. 154(b) by 299 days.

(21) Appl. No.: 11/168,965

(22) Filed: Jun. 28, 2005

(65) Prior Publication Data

US 2006/0000383 A1    Jan. 5, 2006

(30) Foreign Application Priority Data

Jul. 2, 2004    (FR) .................................. 04 07401

(51) Int. Cl.
*B60L 13/04* (2006.01)
(52) U.S. Cl. .................................... 104/282
(58) Field of Classification Search ................ 104/281, 104/282, 283, 284
See application file for complete search history.

(56) References Cited

U.S. PATENT DOCUMENTS 4,280,412 A   7/1981   Mihirogi ..................... 104/281

4,641,586 A * 2/1987   Miller et al. ................. 104/284

FOREIGN PATENT DOCUMENTS

| EP | 0 968 898 | 1/2000 |
|----|-----------|--------|
| JP | 11-78878 | 3/1999 |

* cited by examiner

*Primary Examiner*—S. Joseph Morano
*Assistant Examiner*—Robert J McCarry, Jr.
(74) *Attorney, Agent, or Firm*—Davidson, Davidson & Kappel, LLC

(57) ABSTRACT

This vehicle comprises a body and a levitation device, the body bearing in operation on the levitation device which comprises a first levitation module and a second levitation module connected to the body, and capable of moving to allow the modules to turn relative to the body. The vehicle comprises means for synchronizing movement of the levitation modules comprising a first hydraulic ram between the first module and the body, a second hydraulic ram between the second module and the body, and a fluid-flow circuit connecting the first and second rams to synchronize the actions of the rams. Application to magnetic levitation rail vehicles, for example.

5 Claims, 5 Drawing Sheets

VEHICLE ADAPTED TO MOVE ALONG A RAIL

The present invention relates to a vehicle adapted to move along a rail and comprising a body and a device for levitating the body on the rail, wherein the body bears in operation on the levitation device in a main bearing direction and the levitation device comprises:

a first levitation module and a second levitation module connected to the body and capable of moving in a bearing plane perpendicular to the main bearing direction to allow the modules to turn relative to the body, in particular when the vehicle is moving along a curved section of the rail; and means for synchronizing movement of the first and second levitation modules relative to the body in the bearing plane.

BACKGROUND OF THE INVENTION

In certain vehicles equipped with magnetic levitation modules, modules are situated in line on the rail. The body, which is rigid, bears substantially vertically on a plurality of modules. The modules are guided on the rail. On rectilinear sections of the rail, the modules are aligned along the longitudinal axis of the body. On curved sections of the rail, the modules are oriented to follow the curvature of the rail. However, the body is rigid and is not able to follow the curvature of the rail. The modules are therefore movable relative to the body with a limited amplitude, sufficient to allow orientation of the modules relative to the body.

Means are generally provided for synchronizing movement of the modules relative to the body. Such synchronization means can take the form of a system of swing-arms and cables disposed between the modules and the body. A system of this kind comprises a first swing-arm between a first module and the body, a second swing-arm between a second module and the body, and cables connecting the swing-arms. Movement of the first module relative to the body leads to corresponding movement of the first swing-arm. This movement is transmitted by the cables to the second swing-arm which in turn transmits the movement to the second module.

Accordingly, when the vehicle enters a curve, the first module guided on the rail is oriented relative to the body to follow the curvature of the rail and brings about a synchronous modification of the orientation of the second module relative to the body.

However, such systems are complicated, because the underside of the body of the vehicle must be designed to receive the cables and swing-arms. The underside of the body must comprise fixing means and passages and/or pulleys for routing cables between the swing-arms, which cables must be taut. This imposes constraints on the design of the body.

OBJECTS AND SUMMARY OF THE INVENTION

An object of the present invention is to propose a vehicle of the type cited above in which the connection between the body and the levitation device is simplified.

To this end, the invention provides a vehicle of the above-mentioned type, wherein the synchronization means comprise:

a first hydraulic ram between the first module and the body;
a second hydraulic ram between the second module and the body; and
a fluid-flow circuit connecting the first and second rams to synchronize the actions of the rams.

In particular embodiments, the vehicle may comprise one or more of the following characteristics, taken in isolation or in any technically possible combination:

the first and second modules are disposed in line one behind the other and the first and second rams are disposed between the body and the respective ends of the first and second modules opposite their adjacent ends;
the rams comprise movable rods and are disposed so that their rods move laterally relative to the body;
the first and second rams are connected so that lateral movement in one direction of the rod of one ram causes lateral movement in the opposite direction of the rod of the other ram;
the hydraulic rams are double-acting hydraulic rams each comprising a first chamber and a second chamber separated by a piston attached to the rod of the ram;
the first and second chambers of the first ram are in fluid-flow communication with the first and second chambers of the second ram via the fluid-flow circuit; and
the levitation modules are magnetic levitation modules comprising magnetic means adapted to cooperate with complementary magnetic means of the rail.

BRIEF DESCRIPTION OF THE DRAWINGS

The invention will be better understood on reading the following description, which is given by way of example only and with reference to the appended drawings, in which:

FIG. 3 is a diagrammatic side view of the vehicle;

FIG. 4 is a diagrammatic view of the vehicle in section taken along the line IV-IV, showing a levitation system of the vehicle;

MORE DETAILED DESCRIPTION

Figure 1:
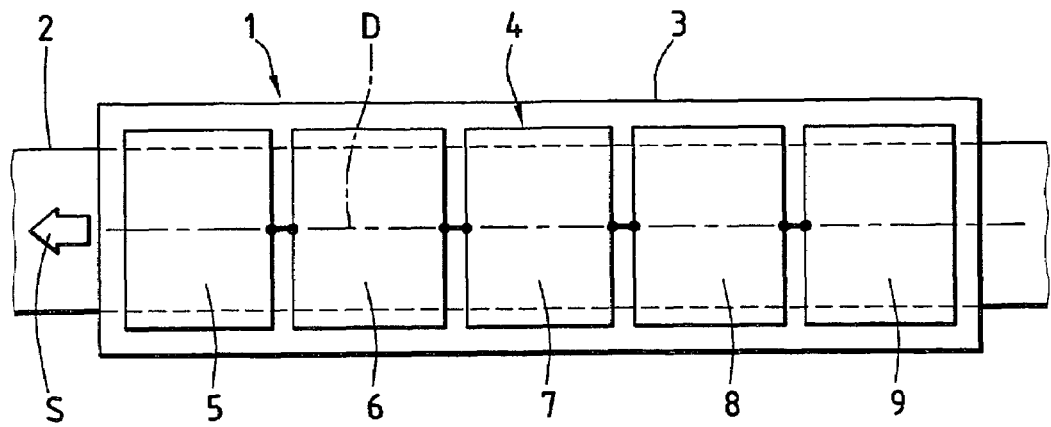
FIG. 1 is a diagrammatic plan view of a vehicle of the invention on a rectilinear rail section.

FIG. 1 shows a vehicle 1 adapted to move along a rail 2 and comprising a body 3 resting on the rail 2 via a levitation system 4 integrated into the vehicle.

Throughout the description below, the orientations referred to are the usual orientations of a rail vehicle. Accordingly, the terms "front", "rear", "right", "left", "lateral", "longitudinal", "upper" and "lower" are to be understood with respect to a longitudinal axis of the vehicle indicated by a chain-dotted line D and to the direction of movement of the vehicle, indicated by an arrow S in FIG. 1.

The levitation system 4 comprises a plurality of modules arranged in a line along the longitudinal axis D under the body 3, here five modules 5, 6, 7, 8, 9. The levitation system 4 comprises, from the front towards the rear, a first or front module 5, a second module 6, a third module 7, a fourth module 8, and a fifth or rear module 9. The body 3 bears on each of the modules 5, 6, 7, 8, 9 in a main bearing direction perpendicular to the plane of FIG. 1.

The modules 5, 6, 7, 8, 9 are connected to the body 3 in such a way that they are able to move in a "bearing" plane perpendicular to the main direction in which the body 3 bears on the modules 5, 6, 7, 8, 9. Here the bearing plane corresponds to the plane of FIG. 1.

The modules 5, 6, 7, 8, 9 are equipped with means for lateral guidance on the rail 2 which is described in more detail below.

When the vehicle 1 is on a rectilinear section of the rail 2 (FIG. 1), the modules 5, 6, 7, 8, 9 are aligned along the longitudinal axis D, corresponding to the axis of the rail.

When the vehicle 1 is located on a curved section of the rail 2 (FIG. 2), the modules 5, 6, 7, 8, 9 follow a curve of substantially circular arc shape defined by the rail 2. Each module 5, 6, 7, 8, 9 moves transversely relative to the body 3 in the bearing plane.

Figures 3, 4:
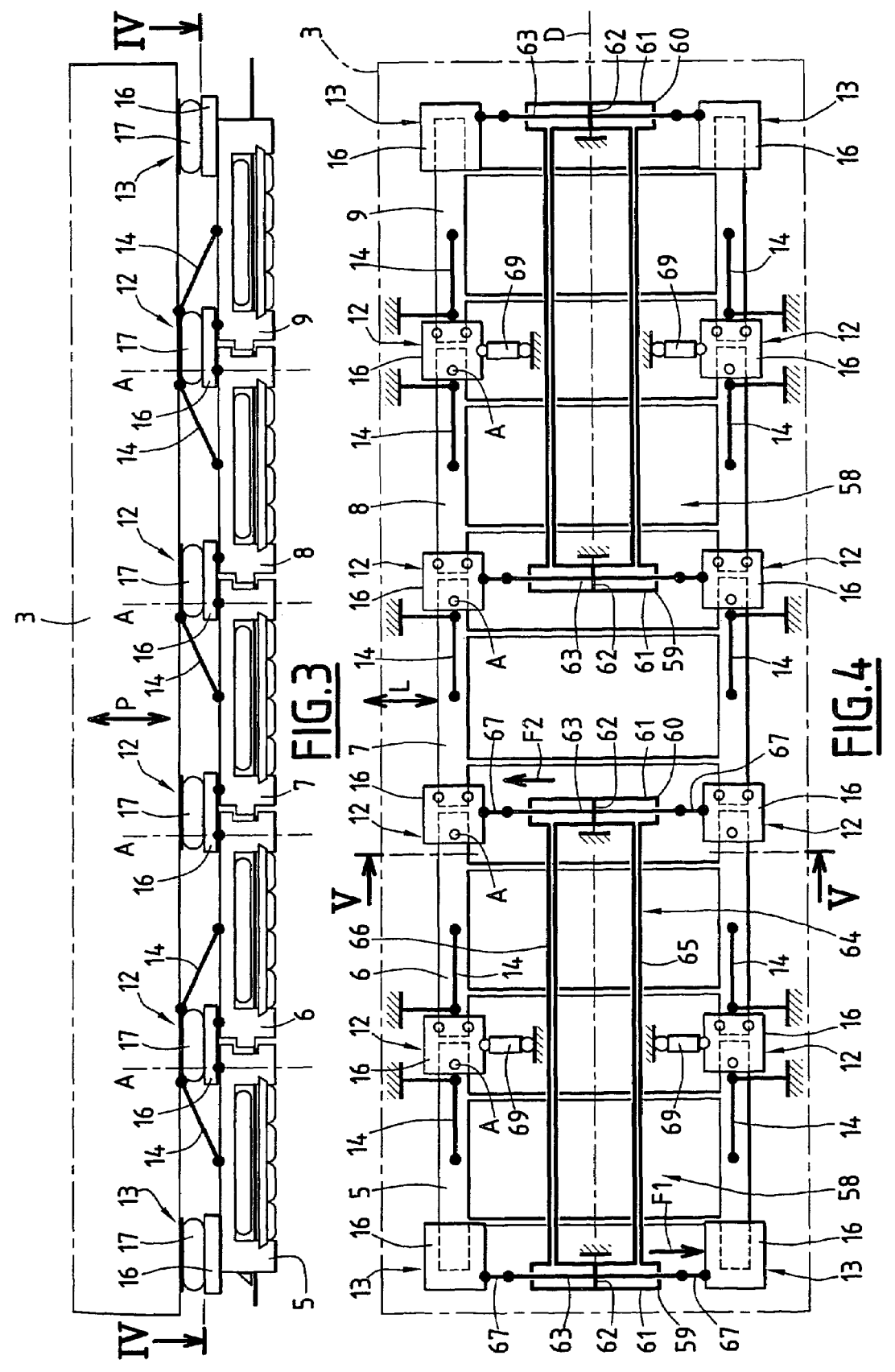

As shown in FIGS. 3 and 4, the body 3 rests on the modules 5, 6, 7, 8, 9 via a plurality of suspensions 12, 13 distributed under the body 3 between the front and the rear of the body.

Each suspension 12, 13 comprises a plate 16 bearing on one or two modules 5, 6, 7, 8, 9 and a spring member 17 (FIG. 3) disposed between the plate 16 and the body 3. The spring member 17 allows movement of the body 3 relative to the plate 16 in the main bearing direction indicated by an arrow P in FIG. 3.

Right and left front suspensions 13 are disposed between the right and left front extremities of the first module 5 and a front portion of the body 3 (on the left in FIGS. 3 and 4). Right and left rear suspensions 13 are disposed between the right and left rear extremities of the fifth module 9 and a rear portion of the body 3 (on the right in FIGS. 3 and 4). The plates 16 of the front and rear suspensions 13 are fixed rigidly to the front and rear modules 5, 9.

Intermediate suspensions 12 are disposed between the front and rear suspensions 13. Each intermediate suspension 12 is situated at the junction between two adjacent modules 5, 6, 7, 8, 9 and divides the forces with which the body 3 bears on those two modules 5, 6, 7, 8, 9.

To this end, the plate 16 of each intermediate suspension 12 is rotatably fixed by a pivot connection with an axis A parallel to the bearing direction P to whichever of the two modules concerned is situated at the front and is in flat sliding bearing engagement with the module situated at the rear.

With a view to coupling the body 3 longitudinally to the modules 5, 6, 7, 8, 9, each module 5, 6, 7, 8, 9 is connected to the body 3 by a connecting link 14 constraining the modules 5, 6, 7, 8, 9 and the body to move together in the longitudinal direction. Each link 14 has one end fixed to a module 5, 6, 7, 8, 9 and the other end fastened to the body 3. The fixing of the links 14 to the body 3 is described in more detail below.

The structures of the modules 5, 6, 7, 8, 9 are similar. Only the structure of the second module 6 is described in detail.

Figure 5:
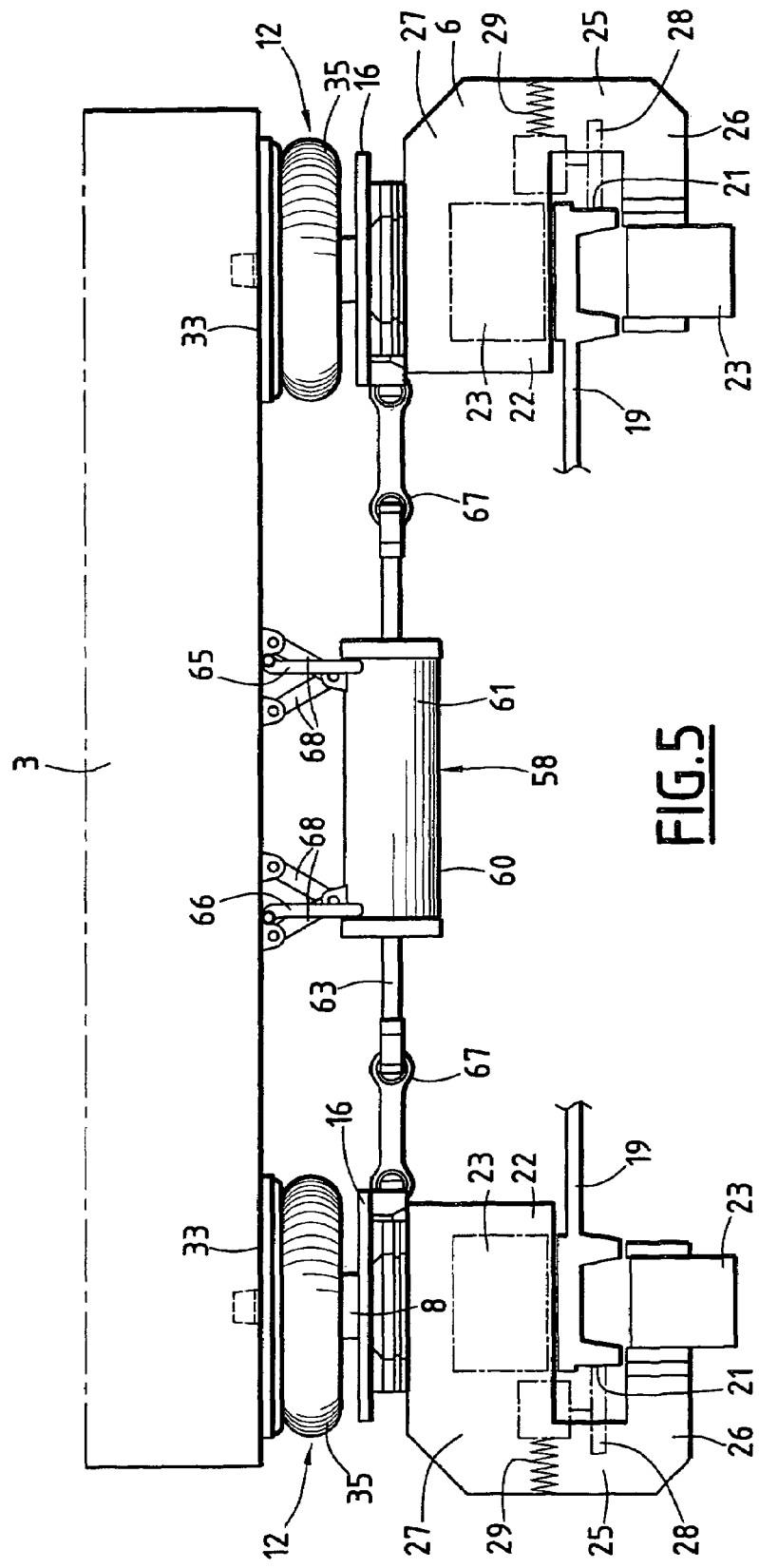
FIG. 5 is a diagrammatic view of the vehicle in cross-section taken along the line V-V.

As can be seen in FIG. 5, the rail 2 comprises laterally spaced right and left lateral flanges 19 extending longitudinally, i.e. perpendicularly to the plane of FIG. 5. Each flange 19 has a lateral guide surface 21. The flanges 19 are connected by an intermediate portion that is not shown.

The second module 6 includes laterally spaced right and left frames 22 that in operation extend along the left and right portions 19 of the rail 2, respectively.

Each frame 22 comprises a C-section longitudinal core having a base 25 from which a lower branch 26 and an upper branch 27 extend laterally toward the other frame 22.

In operation, the portions 19 are accommodated between the lower branch 26 and the upper branch 27.

The base 25 of each frame 22 carries lateral guide means comprising a guide roller 28 in bearing engagement with the lateral surface 21 of the corresponding portion 19. The roller 28 is urged against this lateral surface 21 by a spring member which here takes the form of a spring 29 acting on a movable support carrying the roller.

The upper branch 27 and the lower branch 26 carry permanent magnet or electromagnet means 23 adapted to cooperate with corresponding means (not visible) on the rail to levitate the body 3 above the rail 2 and drive movement of the modules 5, 6, 7, 8, 9 along the rail 2.

The body 3 of the vehicle 1 rests on suspensions at the front and the rear of each frame 22, here on intermediate suspensions 12. Only the intermediate suspensions 12 at the rear of the module 6 are visible in FIG. 5. These intermediate suspensions 12 are disposed between the body 3, the second module 6 and the third module 7 (FIG. 4).

The suspensions 12, 13 of the vehicle 1 are pneumatic diaphragm suspensions. All the suspensions 12, 13 have similar structures. Only the structure of a left intermediate suspension 12 disposed between the body 3, the first module 5 and the second module 6 is described in detail.

Figure 6:
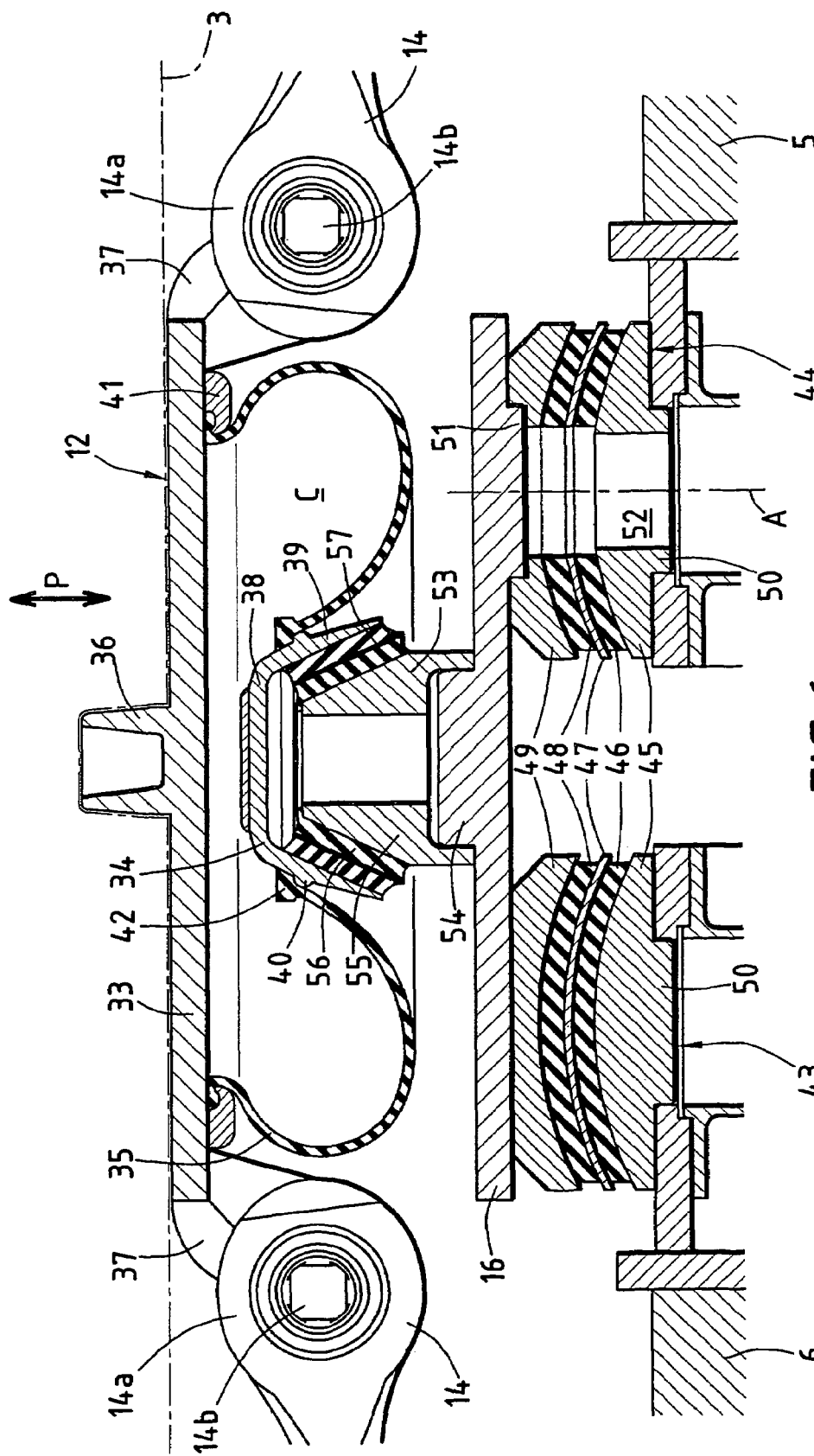
FIG. 6 is a diagrammatic view in longitudinal section of a suspension situated between the vehicle and the levitation system.

As shown in FIG. 6, the intermediate suspension 12 concerned includes an upper connector 33, a lower connector 34 and an annular diaphragm 35.

The upper connector 33 takes the form of a disk with a centering and fixing stud 36 at its centre projecting towards the exterior of the suspension 12. The upper connector 33 extends parallel to the bearing plane. The body 3 bears on the upper connector 33 with the stud 36 received in a complementary housing of the body 3. The stud 36 constrains the upper connector 33 and the body 3 to move together in the bearing plane.

The upper connector 33 has two diametrically opposite yokes molded in one piece with the upper connector 33.

Figure 7:
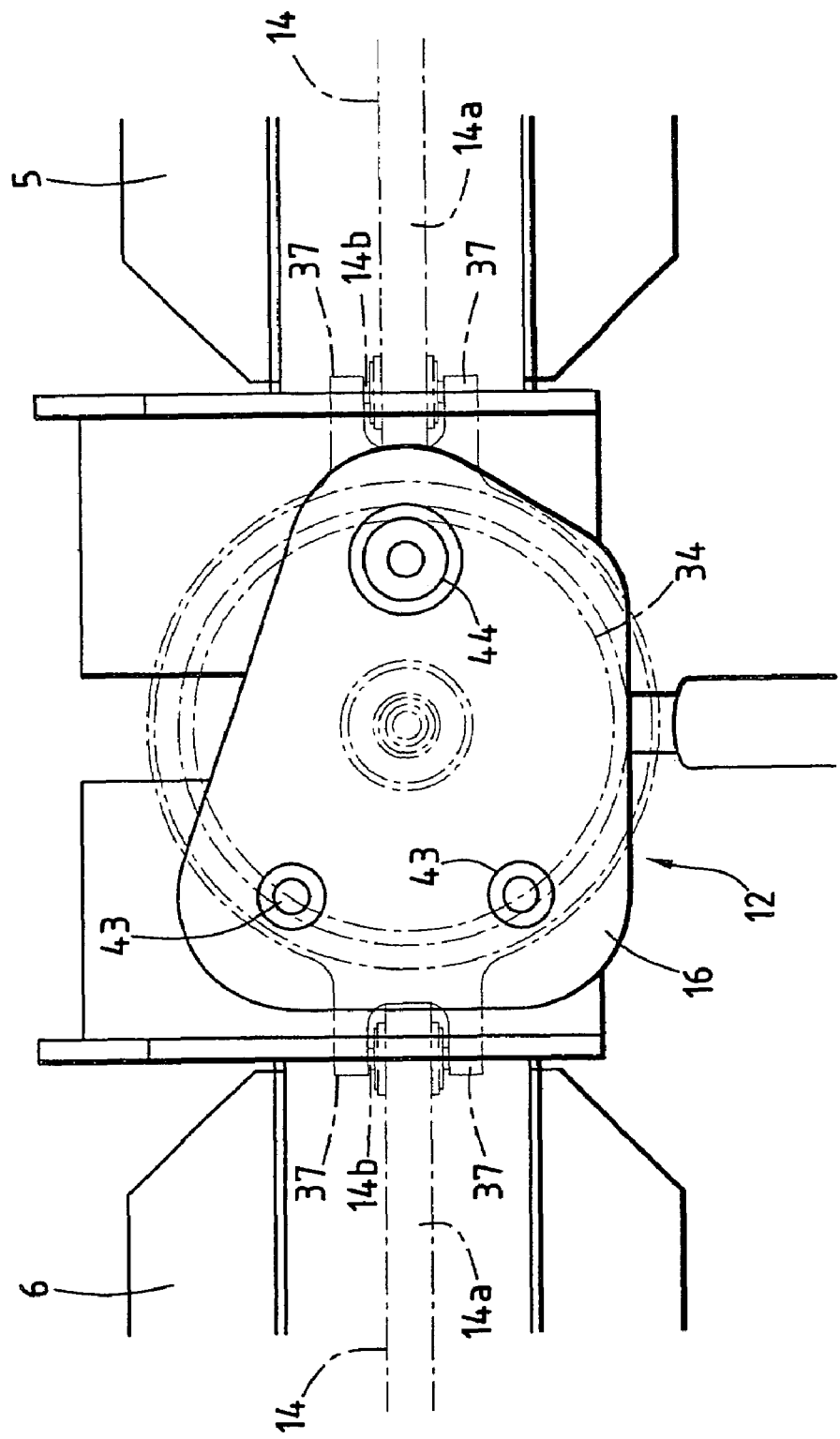
FIG. 7 is a diagrammatic plan view of the FIG. 6 suspension.

As shown in FIG. 7, the yokes are formed by extensions 37 projecting radially outwards from the edge of the upper connector 33. Each yoke has two extensions 37 between the free ends of which are fixed the ends 14a of the connecting links 14, for example by means of a shaft 14b extending transversely between the extensions 37. The ends 14a of the links are therefore fastened longitudinally to the upper connector 33 and consequently to the body 3.

Referring again to FIG. 6, the extensions 37 are curved on the axial side opposite the stud 36 so as not to interfere with the body 3.

The lower connector 34 has a frustoconical profile with a radial portion 38 extended in its area of greatest diameter by a frustoconical portion 39 extending and widening in the direction from the side opposite the upper connector 33. The frustoconical portion 39 has on its exterior surface an annular rib 40 situated substantially halfway between the radial portion 38 and the free edge of the frustoconical portion 39.

The diaphragm 35 defines a sealed cavity C of substantially toroidal shape between the upper connector 33 and the lower connector 34.

The diaphragm 35 has a thicker upper edge of large diameter fixed and sealed against a lower surface of the upper connector 33 by means of a ring 41 gripping the upper edge of the diaphragm 35. The diaphragm 35 has a lower rim of small diameter with a rim 42 bearing in sealed manner on the rib 40 on the frustoconical surface 39 of the lower connector 34.

The sealed cavity C is filled with a compressible fluid, for example air, serving as a suspension cushion. A thrust force directed in the bearing direction P compresses the fluid in the cavity C, which is accompanied by deformation of the diaphragm 35 and movement toward each other of the connectors 33, 34, allowing relative movement between the connectors 33, 34 in the bearing direction P.

Furthermore, the flexibility of the deformable diaphragm 35 allows relative movement of the connectors 33, 34 transversely to the bearing direction P. The diaphragms 35 of the suspensions 12, 13 are of the type allowing large amounts of transverse relative movement, i.e. they allow transverse movements between the upper connector 33 and the lower connector 34 that are large relative to the movement allowed in the bearing direction P.

The transverse movement ratio allowed for movement in the bearing direction P lies in the range 5 to 15. The movement in the bearing direction P lies in the range 10 mm to 30 mm, for example. The transverse movement lies in the range 80 mm to 200 mm, for example.

In a rest position, in which no transverse force is exerted on the suspension 12, the upper connector 33 and the lower connector 34 are aligned in the bearing direction P. In an offset position adopted by the suspension 12 in response to a transverse load, the connectors 33, 34 are off-axis relative to each other. Because of the transverse elasticity of the diaphragm 35, the suspension 12 exerts a transverse force tending to return the connectors 33, 34 to the rest position.

The lower connector 34 bears on the plate 16 which in turn bears on the modules 5, 6 through resilient thrust bearings 43, 44.

A resilient thrust bearing 43, 44 takes the form of an alternating stack of rigid metal members and flexible resilient members. To be more precise, each resilient thrust bearing 43, 44 comprises successively, from the bottom upwards, a thick rigid foot 45, a first resilient layer 46, a thin rigid intermediate layer 47, a second resilient layer 48, and a thick rigid head 49. For fixing it to the corresponding module 5, 6, the foot 45 is provided with a tenon 50 that is accommodated in a complementary housing of the module 5, 6.

The plate 16 bears on a plane upper surface of the head 49 of the first thrust bearing 43 to provide plane contact allowing the plate 16 to slide on the first thrust bearing 43 in the bearing plane.

The plate 16 has at the level of the second thrust bearing 44 a cylindrical projection 51 that is accommodated in a complementary cylindrical recess formed in the head 49 of the second thrust bearing 44 to provide the pivot connection between the plate 16 and the module 6 with its axis A parallel to the bearing direction P. Thus the plate 16 is fastened to the second thrust bearing 44 transversely to the bearing direction P.

In the event of a high load on the suspension 12, compression of the resilient layers 46, 48 of the resilient thrust bearings 43, 44 allows limited movement of the plates 16 relative to the modules 5, 6 in the bearing direction P.

To improve the fixing of the plate 16 to the first module 5, a passage 52 is advantageously provided through the second thrust bearing 44 for rotation guide members to pass through, such as a shaft (not shown).

The lower connector 34 bears on the plate 16 through a connecting part 53. The plate 16 has a protuberance 54 substantially at its centre. The connecting part 53 bears on the top of the plate 16 and includes a recess in which the protuberance 54 engages. The connecting part 53 has on the opposite side a frustoconical end 55 engaged in the lower connector 34. The frustoconical end 55 of the connecting part 53 is connected to the interior surface of the frustoconical portion 39 of the lower connector 34 by two layers of elastic material 56 between which there is a frustoconical insert 57. The resilient layers 56 filter vibrations.

As shown in FIG. 7, the second module 6 carries two laterally spaced first thrust bearings 43. The plate 16 is therefore in bearing engagement on three thrust bearings, comprising two plane thrust bearings 43 on the second module 6 and one pivot connection thrust bearing on the first module 5.

Referring again to FIGS. 3 and 4, the intermediate suspensions 12 differ from one another depending on whether or not connecting links 14 are connected to their upper connectors.

To be more specific, the intermediate suspensions 12 between the second and third modules 6, 7 are not connected to those modules 6, 7 by connecting links 14. The intermediate suspensions 12 between the third and fourth modules 7, 8 are connected by connecting links 14 only to the third module 7. The intermediate suspensions 12 between the fourth and fifth modules 8, 9 are connected to each of those modules 8, 9 by connecting links 14.

The front and rear suspensions 13 differ from the intermediate suspensions 12 in that their plates 16 are fixed rigidly to the frames of the corresponding modules, namely the front module 5 and rear module 9.

The links 14 limit longitudinal movement of the upper connectors 34 relative to the modules 5, 6, 7, 8, 9. Consequently, the upper connectors 33 of the suspensions 12, 13 and the body 3 are able to move in the bearing plane primarily in a lateral direction relative to the modules 5, 6, 7, 8, 9, i.e. a direction in the bearing plane and perpendicular to the longitudinal axis D of the body 3. The lateral direction is perpendicular to the plane of FIG. 6 and is indicated by an arrow L in FIG. 4.

The links 14 are connected to the upper connectors 33 of the intermediate suspensions 12 so as not to impede lateral movements of the upper connectors 33, for example by fixing the ends 14a of the links 14 to the shafts 14b using flexible rubber sleeves.

As shown in FIG. 4, the vehicle 1 has two identical systems 58 for synchronizing movement of the modules 5, 6, 7, 8, 9 relative to the body 3 in the bearing plane.

The front synchronization system 58 shown in FIG. 4 synchronizes the movements of the first module 5 and the second module 6.

It comprises a first ram 59 and a second ram 60. Each ram 59, 60 comprises a cylinder 61, a piston 62 sliding in the cylinder 61 and dividing an interior cavity of the cylinder 61 into separate first and second chambers, and a rod 63 attached to the piston 62. The cylinder 61 is fixed transversely under the body 3. The rod 63 is movable in the lateral direction L in the plane in which the body bears on the modules 5, 6, 7, 8, 9.

To synchronize their movements, the first and second rams 59, 60 are connected by a closed fluid-flow circuit 64 which comprises a first pipe 65 providing fluid-flow communication between the chamber of the first ram 59 and the chamber of the second ram 60 situated on the same side and a second pipe 66 providing fluid-flow communication between the other chamber of the first ram 59 and the other chamber of the second ram 60 situated on the same side.

In the present example, the first pipe 65 connects the left chambers of the first and second rams 59, 60 directly and the second pipe 66 connects the right chambers of the first and second rams 59, 60 directly.

In operation, the rods 63 move laterally towards the left (up in FIG. 4) or towards the right (down in FIG. 4) of the vehicle 1.

Movement of the rod 63 of the first ram 59 towards the left, as indicated by the arrow F1, discharges the fluid contained in the chamber of the first ram 59 on the left toward the chamber of the second ram 60 on the left and sucks fluid into the chamber of the first ram 59 on the right, which fluid comes from the chamber of the second ram 60 on the right. The result of this is that the rod 63 of the second ram 60a moves towards the right, as shown by the arrow F2. Similarly, movement towards the right of the rod 63 of the first ram 59 leads to movement towards the left of the rod 63 of the second ram 60.

In other words, lateral movement of the rod 63 of the first ram 59 leads to opposite lateral movement of the rod 63 of the second ram 60.

The ends of the rod 63 of the first ram 59 are connected by links 67 to the plates 16 of the front suspensions 13. The ends of the rod 63 of the second ram 60 are connected by links 67 to the plates 16 of the suspensions 12 between the body 3 and the rear end of the second module 6. As indicated above, the plates 16 of the intermediate suspensions 12 concerned are constrained to move together in the bearing plane of the rear end of the second module 6. The plates 16 of the front suspensions 13 are fastened together in the bearing plane of the front end of the module 5.

Lateral movement of each plate 16 is therefore accompanied by lateral movement of the corresponding end of the associated module 5, 6.

When the vehicle 1 is moving along a rectilinear section of the rail 2, the first module 5 and the second module 6 are aligned with the body 3. When the vehicle 1 enters a curved section of the rail 2, the front end of the first module 5, guided by the rail 2, follows the curve of the rail 2. This end moves laterally in one direction relative to the body 3. This movement leads to movement of the rod 63 of the first ram 59 and consequently movement of the rod 63 of the second ram 60 in the opposite direction. The rod 63 of the second ram 60 in turn drives lateral movement of the rear end of the second module 6 in the direction opposite to that of the front end of the first module 5. The first module 5 and the second module 6 assume the configuration shown in FIG. 2.

A rear synchronization system 58 (on the right in FIG. 4) synchronizes movements of the central third module 7 and the rear fifth module 9 relative to the body in the bearing plane. This rear synchronization system 58 is described using the reference numbers used above for similar components of the front synchronization system 58.

The ends of the rod 63 of the first ram 59 of the rear synchronization system 58 are connected by links 67 to the plates 16 of the intermediate suspensions 12 between the body 3 and the rear end of the third body 2. The ends of the rod 63 of the second ram 60 of the rear synchronization system 58 are connected by links 67 to the plates 16 of the rear suspensions 13 between the body 3 and the rear end of the fifth module 9.

Lateral movement of the rear end of the third module 6 relative to the body 3 leads to corresponding movement of the rod 63 of the first ram 59 of the rear synchronization system 58. This leads to movement of the rod 63 of the second ram 60 which leads to lateral movement of the rear end of the fifth module 9. The rear end of the third module 7 and the rear end of the fifth module 9 move laterally relative to the body 3 in opposite directions.

The plates 16 of the intermediate suspensions 12 between the first module 5 and the second module 6 and between the fourth module 8 and the fifth module 9 are not connected to the synchronization means. These plates 16 are connected to the body 3 by lateral dampers 69 for limiting and controlling movement between the body 3 and the plates 16.

Figure 2:
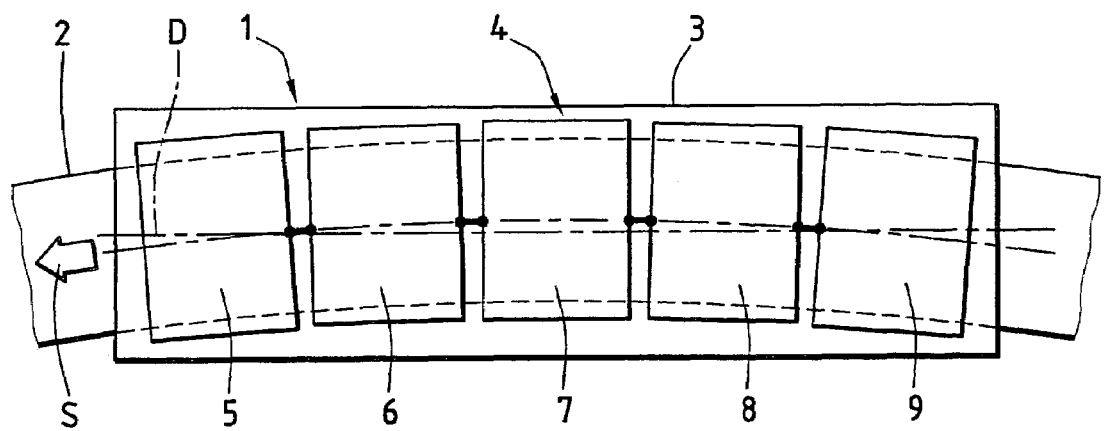
FIG. 2 is a diagrammatic plan view of the vehicle on a curved rail section.

As shown in FIG. 2, in a curve, the body 3 is positioned relative to the modules 5, 6, 7, 8, 9 by the synchronization systems 58 so that the first module 5 and the fifth module 9 are on one side of the longitudinal axis D of the body 3 and the second module 6, the third module 7 and the fourth module 8 are on the opposite side. This arrangement allows satisfactory positioning of the body 3 on the modules 5, 6, 7, 8, 9 in a curve with an appropriate distribution of the bearing loads of the body on the modules 5, 6, 7, 8, 9.

The synchronization modules fit easily under the body 3. The energy of movement of a module relative to the body is recovered by a ram and simply transmitted to the other ram by means of a fluid flowing in the pipes of the fluid-flow circuit of the synchronization system. The pipes are simple to route from one ram to the other, regardless of the profile of the underside of the body. It is not necessary to provide specific housings or passages, since the pipes can be curved or bent as necessary. Furthermore, the fluid-flow circuit is particularly simple, which makes it more reliable and reduces the maintenance required for it to operate correctly.

As can be seen in FIG. 5, a cylinder 61 of a ram 60 of a synchronization system 58, in this instance the cylinder 61 of the second ram 60 of the front synchronization system 58, is simply fixed under the body 3 by means of brackets 68 joining the ends of the cylinder 61 to the underside of the body 3. The pipes 65, 66 of the fluid-flow circuit 64 exit the cylinder 61 and are routed below the underside of the body 3 to free up the space situated under the body 3.

The invention may be applied to vehicles having different levitation means, such as a conventional mechanical levitation means employing wheels.

What is claimed is:

1. A vehicle adapted to move along a rail and comprising a body and a device for levitating the body on the rail, wherein the body bears in operation on the levitation device in a main bearing direction and the levitation device comprises:

a first levitation module and a second levitation module disposed longitudinally in line under the body, each module having lateral guidance along the rail and being capable of moving relative to the body in a bearing plane perpendicular to the main bearing direction to allow each module to turn relative to the body in the bearing plane, in particular when the vehicle is moving along a curved section of the rail; and a synchronization device for synchronizing movement of the first and second levitation modules relative to the body in the bearing plane;

wherein the synchronization device includes:

a first hydraulic ram between the first module and the body;

a second hydraulic ram between the second module and the body; and a fluid-flow circuit connecting the first and second rams to synchronize the actions of the rams;

the first and second rams comprising movable rods, the first and second rams being disposed so that the rods move laterally relative to the body; and the first and second rams being connected so that lateral movement in one direction of the rod of one of the first and second rams causes lateral movement in the opposite direction of the rod of the other of the first and second rams.

2. A vehicle according to claim 1, wherein the first and second modules are disposed in line one behind the other and the first and second rams are disposed between the body and the respective ends of the first and second modules opposite their adjacent ends.

3. The vehicle according to claim 1, wherein the first and second hydraulic rams are double-acting hydraulic rams each comprising a first chamber and a second chamber separated by a piston attached to the rod of the ram.

4. A vehicle according to claim 3, wherein the first and second chambers of the first ram are in fluid-flow communication with the first and second chambers of the second ram via the fluid-flow circuit.

5. The vehicle according to claim 1, wherein the levitation modules are magnetic levitation modules comprising magnetic means adapted to cooperate with complementary magnetic means of the rail.

* * * * *